US012013198B2

(12) United States Patent
Moilanen et al.

(10) Patent No.: US 12,013,198 B2
(45) Date of Patent: Jun. 18, 2024

(54) METHOD AND SYSTEM FOR CLEANING A DEVICE HOLDING FLUID

(71) Applicant: ALTUM TECHNOLOGIES OY, Helsinki (FI)

(72) Inventors: Petro Moilanen, Kinkomaa (FI); Timo Rauhala, Helsinki (FI); Kasper Peterzens, Espoo (FI); Ari Salmi, Helsinki (FI); Edward Haeggström, Helsinki (FI)

(73) Assignee: ALTUM TECHNOLOGIES OY, Helsinki (FI)

( * ) Notice: Subject to any disclaimer, the term of this patent is extended or adjusted under 35 U.S.C. 154(b) by 373 days.

(21) Appl. No.: 17/428,752

(22) PCT Filed: Jan. 10, 2020

(86) PCT No.: PCT/FI2020/050016
§ 371 (c)(1),
(2) Date: Aug. 5, 2021

(87) PCT Pub. No.: WO2020/161382
PCT Pub. Date: Aug. 13, 2020

(65) Prior Publication Data
US 2022/0107147 A1 Apr. 7, 2022

(30) Foreign Application Priority Data
Feb. 6, 2019 (FI) ..................................... 20195083

(51) Int. Cl.
*F28G 7/00* (2006.01)
*B06B 3/00* (2006.01)
*F28G 9/00* (2006.01)

(52) U.S. Cl.
CPC .................. *F28G 7/00* (2013.01); *B06B 3/00* (2013.01); *F28G 9/00* (2013.01)

(58) Field of Classification Search
CPC ....... F28G 7/00; B06B 1/0611; B06B 1/0614; B06B 1/06; B08B 7/026; B08B 7/028; B08B 7/02
See application file for complete search history.

(56) References Cited

U.S. PATENT DOCUMENTS 4,120,699 A * 10/1978 Kennedy, Jr. ............. B08B 3/12 165/95
4,375,991 A * 3/1983 Sachs ........................ F28G 7/00 165/95
(Continued)

FOREIGN PATENT DOCUMENTS

EP 1 149 637 10/2001
FI 20195462 A1 * 1/2021
(Continued)

OTHER PUBLICATIONS

International Search Report for PCT/FI2020/050016 dated May 28, 2020, 4 pages.
(Continued)

*Primary Examiner* — Jenna M Maroney
(74) *Attorney, Agent, or Firm* — NIXON & VANDERHYE

(57) ABSTRACT

Methods and systems for cleaning devices holding fluid which use a system such as a transducer assembly including at least one pair of protrusions acting as point-like pressure sources or at least one substantially circular protrusion acting as a substantially circular point-like pressure source, coupled to an outer surface of the device to be cleaned.

16 Claims, 8 Drawing Sheets

(56) References Cited

U.S. PATENT DOCUMENTS

| | | | | | |
|---|---|---|---|---|---|
| 4,691,724 | A * | 9/1987 | Garcia | B08B 3/12 376/310 |
| 5,137,580 | A * | 8/1992 | Honda | B06B 3/00 134/1 |
| 5,462,604 | A * | 10/1995 | Shibano | B06B 1/0284 310/317 |
| 6,290,778 | B1 * | 9/2001 | Zugibe | F28G 7/00 134/1 |
| 7,837,750 | B2 * | 11/2010 | Katinas | B08B 5/02 55/300 |
| 11,624,566 | B2 * | 4/2023 | Hæggström | B08B 13/00 134/1 |
| 2007/0267176 | A1 | 11/2007 | Song et al. | |
| 2008/0073063 | A1 * | 3/2008 | Clavenna | F28F 19/02 165/84 |
| 2012/0055521 | A1 * | 3/2012 | Kim | B08B 3/12 134/184 |
| 2018/0147610 | A1 | 5/2018 | Birkin | |
| 2019/0111457 | A1 * | 4/2019 | Haeggström | B08B 3/12 |
| 2022/0219199 | A1 * | 7/2022 | Haeggström | B08B 9/0326 |

FOREIGN PATENT DOCUMENTS

| | | | | |
|---|---|---|---|---|
| JP | S5265349 | A | 5/1977 | |
| JP | S55-155774 | | 12/1980 | |
| JP | H02-34923 | | 2/1990 | |
| JP | 2008062162 | A | 3/2008 | |
| WO | 98/49671 | | 11/1998 | |
| WO | 2007/011520 | | 1/2007 | |
| WO | WO-2017194839 | A1 * | 11/2017 | B08B 17/02 |
| WO | WO-2020161382 | A1 * | 8/2020 | B06B 3/00 |
| WO | WO-2020240086 | A1 * | 12/2020 | B06B 1/0611 |

OTHER PUBLICATIONS

Written Opinion of the ISA for PCT/FI2020/050016 dated May 28, 2020, 6 pages.
Finnish Search Report for 20195083 dated Aug. 26, 2019, 1 page.
Office Action, issued in Japanese Patent Application No. 2021-545844 dated Jan. 30, 2024.

* cited by examiner

METHOD AND SYSTEM FOR CLEANING A DEVICE HOLDING FLUID

CROSS-REFERENCE TO RELATED APPLICATIONS

This application is the U.S. national phase of International Application No. PCT/FI2020/050016 filed Jan. 10, 2020 which designated the U.S. and claims priority to Finnish 20195083 filed Feb. 6, 2019, the entire contents of each of which are hereby incorporated by reference.

BACKGROUND OF THE INVENTION

Field of the Invention

The present invention relates methods for cleaning devices holding fluid such as heat exchangers, in particular to methods wherein the cleaning is performed by using a transducer assembly comprising point-like pressure sources in contact with outer surface of the device. The invention relates also to systems such as transducer assemblies suitable for use in the method.

Description of the Related Art

Fouling within industry has an impact on both capital and operation costs. An increase in internal fouling results in poor thermal efficiency. This is coupled with poor heat and mass transfer to the metal surface of designed heat exchangers, pipes and other equipments. The cleaning of fouled heat exchanges presents a significant challenge to the maintenance and operation of e.g. chemical, petroleum and food processes. Despite efforts in the design of processes and hardware to minimize fouling, eventually the intricate interior surface of the exchanger require cleaning to restore the unit to the required efficiency.

Heat exchangers are typically cleaned onsite by removing the exchanger and by placing the unit on a wash pad for spraying with high pressure water to remove foulants. Cleaning heat exchangers in an ultrasonic bath requires specially designed vessels that allow coupling sound into them and that are capable of holding sufficient fluid to affect the cleaning, and that feature specific design to allow easy removal of the foulant material from the immersed device.

US 2012055521 discloses a segmental ultrasonic cleaning apparatus configured to remove scales and/or sludge deposited on a tube sheet. The segmental ultrasonic cleaning apparatus includes a plurality of segment groups arranged in a ring shape on a top surface of a tube sheet along an inner wall of the steam generator, in which each segment groups includes an ultrasonic element segment and a guide rail support segment loosely connected to each other by metal wires located at a lower portion of the steam generator, such that ultrasound radiated from transducer in each of the ultrasonic element segments travels along the surface of the tube sheet, with the segment groups tightly connected in the ring shape by tightening the metal wires via wire pulleys of flange units.

US 2007267176 discloses a method wherein fouling of heat exchange surfaces is mitigated by a process in which an ultrasound is applied to a fixed heat exchanger. According to the document, the ultrasound excites a vibration in the heat exchange surface and produce waves in the fluid adjacent to the heat exchange surface. The ultrasound is applied by a dynamic actuator coupled to a controller to produce vibration at a controlled frequency and amplitude that minimizes adverse effects to the heat exchange structure. The dynamic actuator may be coupled to the heat exchanger in place and operated while the heat exchanger is online.

US2008073063 discloses a method for reducing the formation of deposits on the inner walls of a tubular heat exchanger through which a petroleum-based liquid flows. The method comprises applying one of fluid pressure pulsations to the liquid flowing through the tubes of the exchanger and vibration to the heat exchanger to affect a reduction of the viscous boundary layer adjacent to the inner walls of the tubular heat exchange surfaces. Fouling and corrosion were further reduced using a coating on the inner wall surfaces of the exchanger tubes.

FIG. 1 shows a typical transducer assembly 100 comprising mechanical wave generating means 101, such as an ultrasound transducer and a waveguide 102. The transducer assembly comprises a first end 100*a* adapted to be in contact with a device to be cleaned. The fundamental resonance frequency of the transducer assembly is 20 kHz, and there are antinodes at both ends of the transducer assembly. To mimic the impact of mechanical loading by the device to be cleaned, a rigid boundary condition is introduced at the first end 100*a* of the transducer assembly. As a result of this loading, a node is created at the first end and the new resonance frequency of the transducer assembly is 25 kHz. The waveform of the loaded transducer assembly is also presented in the figure.

In FIG. 2 the transducer assembly 100 is attached on an outer surface 103*a* of a wall 103 of a device to be cleaned. The wall is made of metal and its thickness h is 10 mm. The contact area b of the transducer assembly is essentially 100% of the total area a of the first end. The contact to the metal wall alters the tuning frequency of the transducer from 25 kHz to 27 kHz. Accordingly, the wall interface changes the fundamental resonance of the transducer, and the coupled resonance at 27 kHz is damped as shown in FIG. 3.

As shown in FIGS. 1-3, the use of transducers like 100 for cleaning purposes has its challenges. Accordingly, there is a need for further methods for cleaning of devices.

SUMMARY OF THE INVENTION

The present invention is based on the observation that at least some of problems related to cleaning of a device for holding fluid, such as a heat exchanger, can be avoided or at least alleviated when the cleaning is performed by using a system, such as a transducer assembly which is able to operate at its fundamental resonance frequency even when in contact with the device to be cleaned.

Accordingly, it is an object of the present invention to provide a method for cleaning a device holding fluid, the device comprising a wall comprising an outer surface and an inner surface, the method comprising following steps:

a) providing a system comprising
   mechanical wave generating means and
   a first end comprising
      at least one pair of protrusion adapted to act as a pair of point-like pressure sources or
      at least one substantially circular protrusion adapted to act as a substantially circular point-like pressure source,
b) contacting the at least one pair of protrusions or the at least one substantially circular protrusion with the outer surface,
c) the mechanical wave generating means emitting, via the at least one pair of protrusions or via the at least one substantially circular protrusion, a succession of mechanical waves comprising an antinode substantially at the first end towards the inner surface, d) the mechanical waves interfering on the inner surface and producing a vibrating inner surface, and e) the vibrating inner surface producing and emitting a pressure pulse into the fluid.

According to another aspect the present invention concerns a system for cleaning a device for holding fluid, the system comprising mechanical wave generating means and a first end comprising at least one pair of protrusions adapted to act as a pair of point-like pressure sources or at least one substantially circular protrusion adapted to act as a substantially circular point-like pressure source, wherein the mechanical wave generating means is adapted to emit a succession of mechanical waves towards the at least one pair of protrusions or towards the at least one substantially circular protrusion, and wherein waveform of the mechanical waves is such that there is an antinode substantially at the first end.

According to still another aspect the present invention concerns use of a system comprising mechanical wave generating means and a first end comprising at least one pair of protrusions adapted to act as a pair of point-like pressure sources or at least one substantially circular protrusion adapted to act as a substantially circular point like pressure source, wherein the mechanical wave generating means is adapted to emit succession of mechanical waves towards the at least one pair of protrusions or towards the at least one substantially circular protrusion, and wherein waveform of the mechanical waves is such that there is an antinode substantially at the first end, for cleaning a device holding fluid.

Further objects of the present invention are also described.

Exemplifying and non-limiting embodiments of the invention, both as to constructions and to methods of operation, together with additional objects and advantages thereof, are best understood from the following description of specific exemplifying embodiments when read in connection with the accompanying drawings.

The verbs "to comprise" and "to include" are used in this document as open limitations that neither exclude nor require the existence of unrecited features. The features recited in the accompanied depending claims are mutually freely combinable unless otherwise explicitly stated. Furthermore, it is to be understood that the use of "a" or "an", i.e. a singular form, throughout this document does not exclude a plurality.

The terms acoustic, elastodynamic and ultrasonic are used in this document as synonyms.

BRIEF DESCRIPTION OF THE DRAWINGS

The exemplifying and non-limiting embodiments of the invention and their advantages are explained in greater detail below with reference to the accompanying drawings, in which.

DESCRIPTION OF THE PREFERRED EMBODIMENTS

Figure 1:
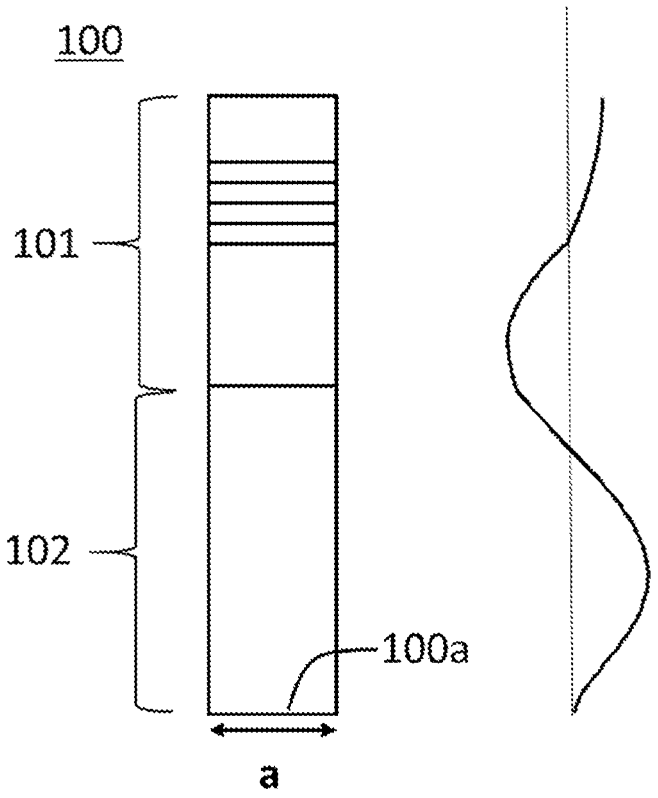
FIGURE 1 (PRIOR ART)
FIG. 1 shows a transducer assembly comprising a waveguide comprising a surface at the end adapted to be contacted with a device to be cleaned.
Figure 2:
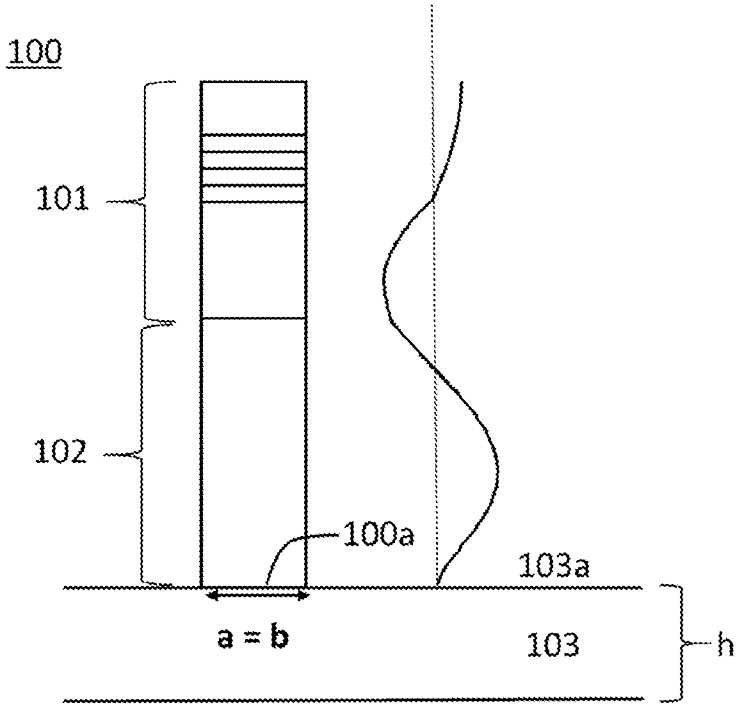
FIGURE 2 (PRIOR ART)
FIG. 2 shows a situation where the transducer assembly of FIG. 1 is connected to an outer surface of a device to be cleaned.
Figure 3:
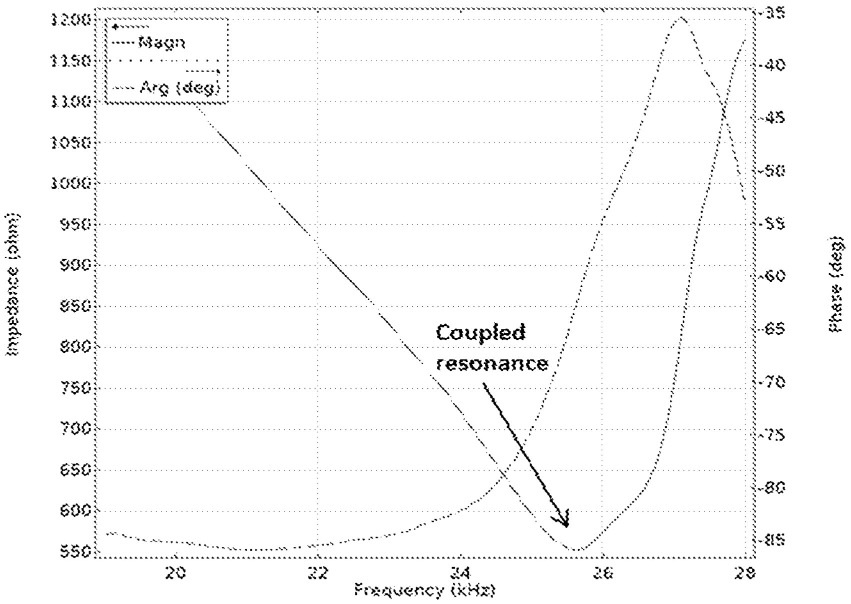
FIGURE 3 (PRIOR ART)
FIG. 3 shows electrical impedance curves of a situation wherein the transducer assembly of FIG. 1 is connected with at a 10 mm thick metal wall.

FIGS. 1-3 have been discussed in Background section of this document.

As defined herein, a point-like pressure source is a pressure source which has at least one of its dimension adapted to be in contact with the device to be cleaned smaller, e.g. at least two times smaller than the wavelength generated by the pressure source in a fluid within the device to be cleaned and/or in the wall of the device to be cleaned. For example, for a point source contacting a metal surface utilizing longitudinal 20 kHz ultrasound, a point-like pressure source is a source with a contact diameter significantly smaller than 25 mm, e.g. 12.5 mm, and for 100 kHz ultrasound, significantly smaller than 5 mm, e.g. 2.5 mm. For different wave modes, these diameters are adjusted according to the speed of sound of the mode.

An exemplary substantially circular point like pressure source is a substantially circular protrusion surrounding acoustic axis of a transducer assembly. An exemplary pair of point-like pressure sources is a pair of parallel protrusion such as two parallel lines in form of ridges at the first end of a transducer assembly.

In the following text, the system used in the method of the present invention is exemplified by different transducer assemblies.

Figure 4:
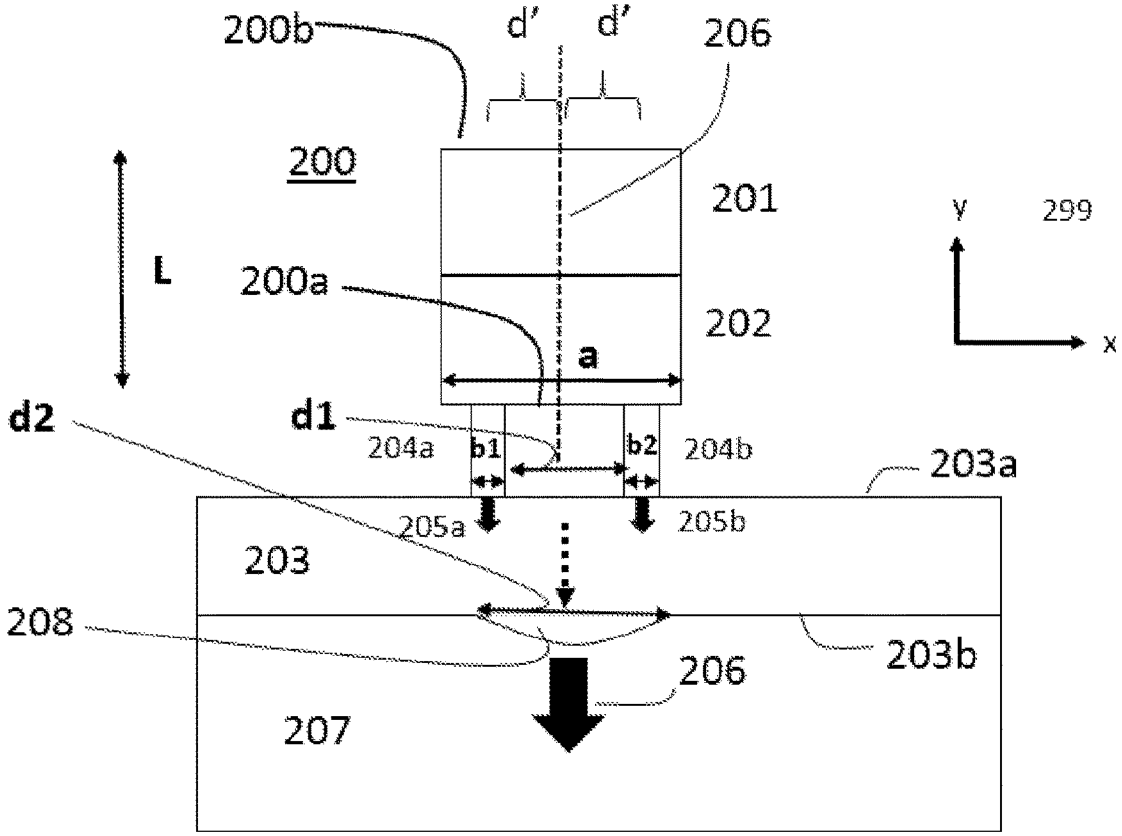
FIG. 4 shows the principle of the method of present invention for cleaning a device holding fluid demonstrated by using an exemplary non-limiting transducer assembly.

The principle of the method of the present invention for cleaning a device holding fluid, such as liquid, is presented using an exemplary non-limiting transducer assembly shown in FIG. 4. Accordingly, a transducer assembly 200 suitable for the method comprises a mechanical wave generating means 201 and at least one pair of point-like pressure sources or at least one substantially circular point-like pressure source at the first end 200*a* of the transducer assembly. In FIG. 4, the point-like pressure sources are represented by a pair of protrusions, i.e. the first protrusion 204*a* and the second protrusion 204*b*. The exemplary non-limiting transducer assembly of FIG. 4 includes also an optional waveguide 202 between the first end 200*a* and the mechanical wave generating means 201.

The mechanical wave generating means 201 is adapted to emit a succession of mechanical waves towards the point-like pressure sources. The waveform of the mechanical waves is such that there is an antinode substantially at the first end 200*a* of the transducer assembly. The correct position of the antinode can be adjusted by proper design of the transducer assembly as discussed later in detail.

The pair of protrusions is preferably located around the acoustic axis 206 of the transducer assembly and separated from each other by a distance d1. The distance of the protrusions from the acoustic axis is marked with symbol d'.

The transducer assembly is placed in mechanical contact with the outer surface 203*a* of the wall 203 of the device to be cleaned via the pair of protrusions. The contact surface of the first protrusion 204*a* and the contact surface of the second protrusion 204*b* are marked in the figure with symbols b1 and b2, respectively. The sum of the contact areas, i.e. b1+b2, of the protrusions is significantly smaller than the area a of the first end of the transducer assembly. According to an exemplary embodiment, the sum of the contact areas is 1-30% of the area of the first surface.

When the transducer assembly is in operation, the mechanical wave generating means emits a succession of mechanical waves 205*a*, 205*b* via the protrusions 204*a* and 204*b* towards the inner surface 203*b*. Accordingly, as the mass loading of the transducer assembly to the device to be cleaned is reduced compared e.g. to the transducer assembly 100, operation of the transducer close to its natural resonance frequency is permitted. When the rigid contact is limited to point-like pressure sources, i.e. to the contact surfaces of the protrusions only, the free surface area on the first end of the transducer assembly remains large enough to permit displacements and formation of an antinode substantially at the first end of the transducer assembly. As a result, the transducer is able to operate substantially at its fundamental resonance frequency, and the protrusions still permit ultrasonic power delivery into the device.

The emitting mechanical waves interfere at the inner surface in particular within the distance d2 which is substantially the projection of d1 onto the inner surface. The interfering mechanical waves make the inner surface vibrate. As the vibrating inner surface moves, the motion produces pressure pulse 206 in the fluid 207 in the device. The displacement is shown in the figure as an enlargement 208. The pressure pulse cleans the device, for instance removes fouling from the device.

Figure 9:
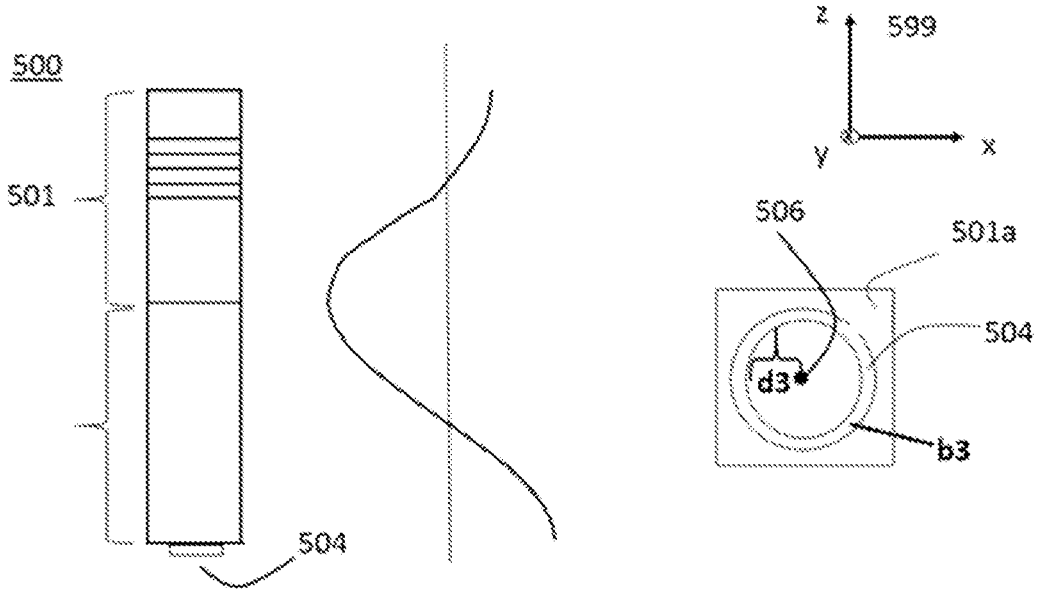

The technical effect can be achieved by using at least one substantially circular point-like pressure source instead of a pair of protrusions. An exemplary transducer assembly comprising circular point-like pressure source are shown in FIG. 9. The design of the transducer assembly shown therein is such that there is an antinode positioned at first end when the mechanical wave generating means is in operation.

When the phase difference between mechanical waves emitted from the first point-like pressure source and mechanical waves emitted from the second point-like pressure source is an even multiple of π, the wave vector is along y-direction of the coordinate system 299. The wave vector is shown in the figure as a dotted arrow. This can be achieved by using point-like pressure sources of equal length.

When the phase difference between ultrasound waves emitted from the first point-like pressure source and ultrasound waves emitted from the second point-like pressure source is between even multiple of π and odd multiple of π, the direction of wave vector differs from the y-direction of the coordinate system 299. The direction of the wave vector can be adjusted as desired. This can be achieved by using protrusions adapted to act as point-like pressure sources wherein the lengths of the protrusions differ from each other.

Thus, according to one embodiment, the method of the present invention concerns a method for cleaning a device holding fluid, the device comprising a wall comprising an outer surface and an inner surface, the method comprising the following steps a) providing a system 200 comprising
  mechanical wave generating means 201 and
  a first end 200*a* comprising
    at least one pair of protrusion 204*a,b* adapted to act as a pair of point-like pressure sources or
    at least one substantially circular protrusion adapted to act as a substantially circular point-like pressure source,
b) contacting the at least one pair of protrusions or the at least one substantially circular protrusion with the outer surface,
c) the mechanical wave generating means emitting, via the at least one pair or protrusion or via the at least one substantially circular protrusion, a succession of mechanical waves comprising an antinode essentially at the first end towards the inner surface,
d) the mechanical waves interfering at the inner surface and producing a vibrating inner surface, and
e) the vibrating inner surface producing and emitting a pressure pulse into the fluid.

Figure 5:
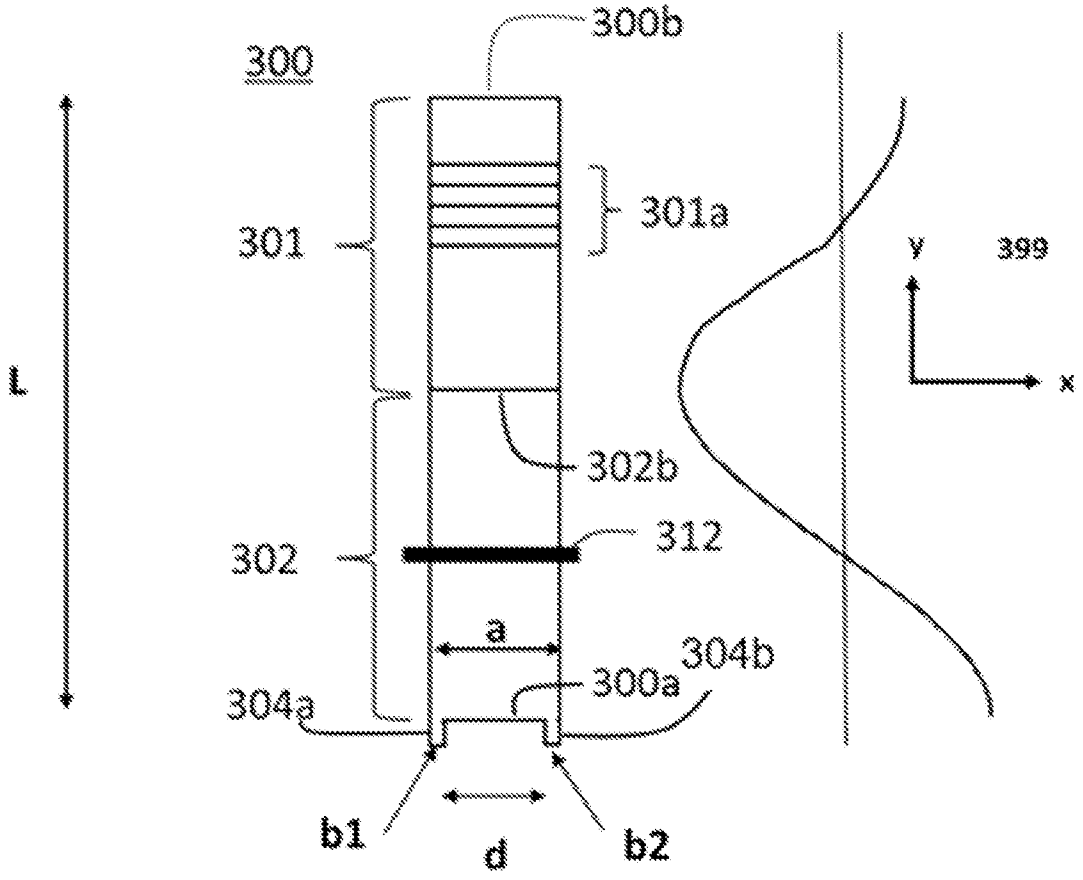
FIG. 5 shows an exemplary transducer assembly suitable for the method of the present invention and its waveguide.

FIG. 5 shows another exemplary transducer assembly 300 suitable for the method of the present invention. The transducer assembly comprises a mechanical wave generating means 301, such as a Langevin transducer, and a waveguide 302 between the mechanical wave generating means and the first end 300*a* of the transducer assembly. The tuning frequency of the transducer assembly is 20 kHz (i.e. consistent with the fundamental resonance frequency of the transducer). In the figure, also the shape of the waveform is presented. As shown in the figure, there is an antinode substantially at the first end 300*a* of the transducer assembly. The first end comprises a first protrusion 304*a* and a second protrusion 304*b*, i.e. a pair of protrusion. The first protrusion is separated from the second protrusion by a distance d. An exemplary distance is 30 mm. According to an exemplary embodiment the height of the protrusion in the y-direction of the coordinate system 399 is 1-100 mm. An exemplary protrusion length is 10 mm. The protrusions are adapted to act as point-like pressure sources.

The distance d between the two protrusion in the x-direction of the coordinate system 399 is preferably smaller than half of the acoustic wavelength in the fluid and/or wall of the device, for example, at 20 kHz d<38 mm. If the wall thickness of the device to be cleaned is thin e.g. <10 mm, the protrusions should be close to each other. An exemplary distance d is 5-25 mm, 20 kHz. This is to ensure that an interference point is formed on the inner surface of the wall.

Figure 6:
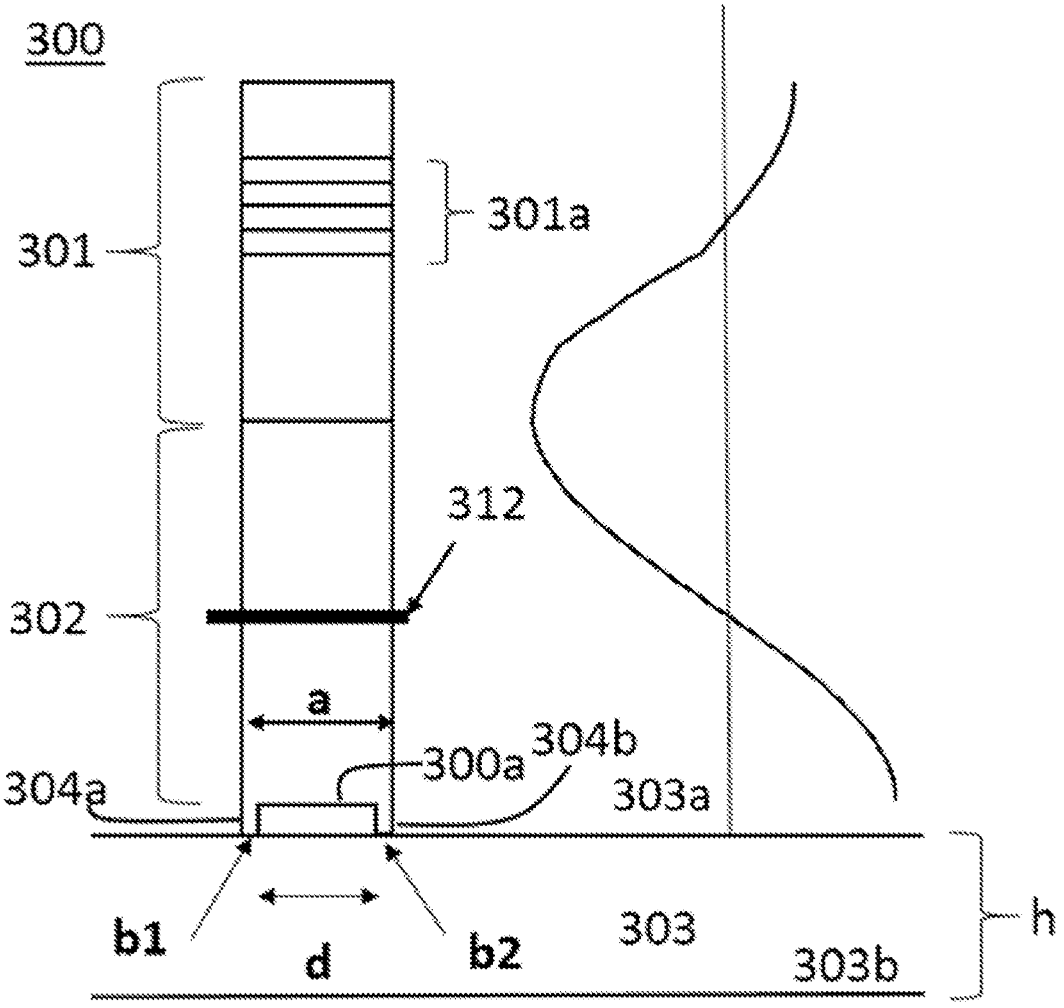
FIG. 6 shows a system comprising a transducer of FIG. 5 connected to a 10 mm thick metal wall of a device to be cleaned.
Figure 7:
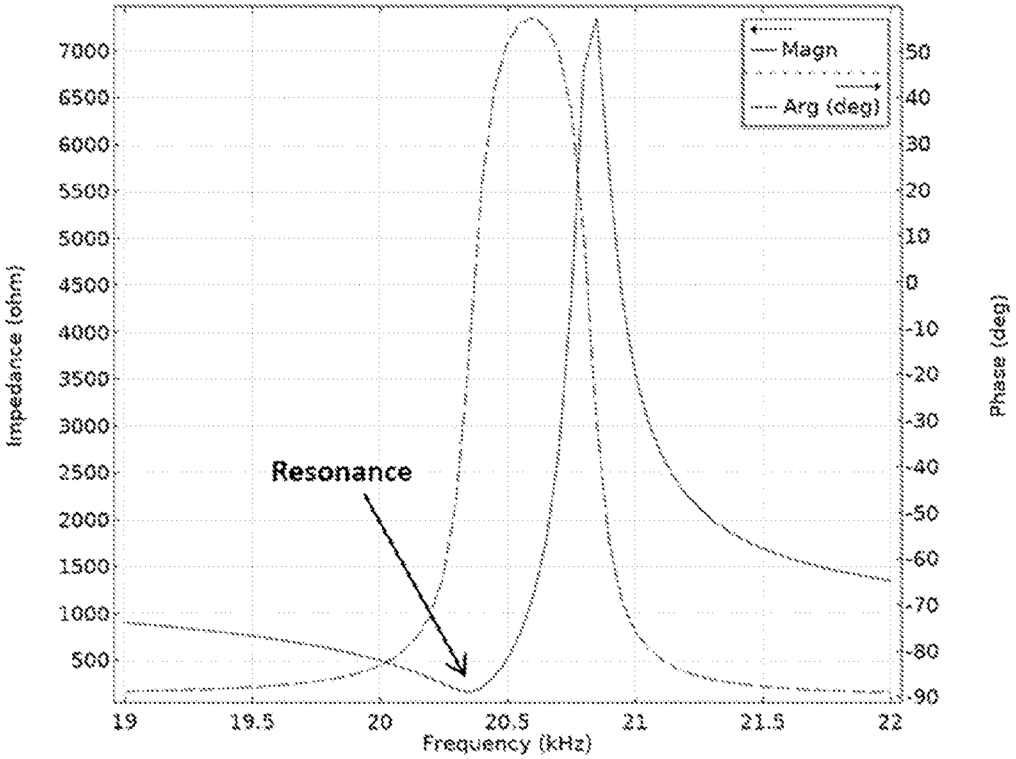
FIG. 7 shows electrical impedance curves at a 10 mm thick metal wall according to the system of FIG. 6, FIGS. 8, 9 and 11 show further exemplary transducer assemblies suitable for the method of the present invention.

FIG. 6 shows a situation wherein the transducer assembly 300 is in contact with an outer surface 303*a* of a wall 303 of a device to be cleaned. The thickness h of the wall is 10 mm. As shown in the figure, there is still an antinode at the first end of the waveguide, resembling the situation of a free transducer. This allows the transducer assembly to operate at its natural frequency, even when in contact with the outer surface of the device to be cleaned. Thus, the first protrusion act as a first point-like pressure source, and the second protrusion acts as a second point-like pressure source. In strict contrast to the transducer assembly 100, operation of the transducer assembly 300 at its fundamental resonance frequency is permitted. This is also clearly demonstrated by comparing electric impedance curves of the transducer operating at a metal wall using the transducer assembly 100 and transducer assembly operating in free space 300 (FIG. 3 vs FIG. 7). Figures show the magnitude (Magn) and phase (Arg) of the impedance. FIG. 7 shows curves for a partially mechanically loaded transducer (i.e. transducer featuring a protrusion contact). The resonance frequency is 20.4 kHz i.e. consistent with the fundamental resonance of the transducer, the impedance magnitude is relatively low (100Ω) and the phase curve shifts from negative to positive at the resonance. The curves are very close to those of an unloaded transducer. In comparison, FIG. 3 shows curves for a fully mass loaded transducer. The resonance frequency is shifted to 26 kHz, the impedance magnitude is relatively high (550Ω) and the phase curve does not shift from negative to positive at the resonance.

According to an embodiment shown in FIGS. 4 and 5, the transducer assembly comprises an optional waveguide. The advantage of the waveguide is that it can be used for tuning the length L of the transducer assembly, i.e. the distance between the first end 200*a*, 300*a* and the second end 200*b*, 300*b* such that there is an antinode at the first end. Furthermore, a waveguide may be useful in applications wherein the transducer assembly need to be in contact with hot surfaces by isolating the mechanical wave generating means from the heat source.

Figure 8:
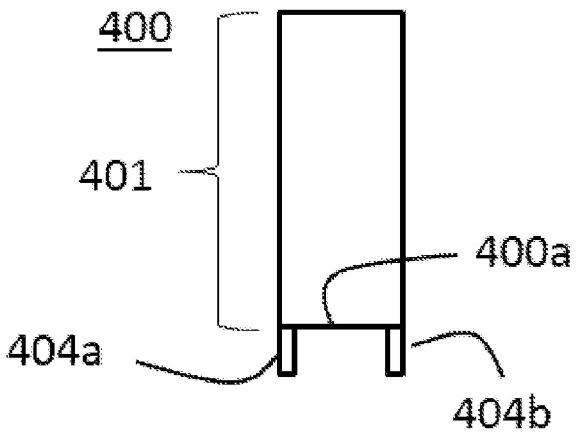

As discussed above the waveguide is optional. A transducer assembly 400 without the waveguide is shown in FIG. 8. The transducer assembly shown in the figure comprises a mechanical wave generating means 401 and a pair of protrusion 404*a*, 404*b* adapted to act as a pair of point-like pressure sources positioned at the first end 400*a* of the transducer assembly. The mechanical wave generating means is adapted to emit a succession of mechanical waves towards the point like pressure sources. The shape of the waveform is such that there is an antinode substantially at the first end 400*a* of the transducer assembly.

A still further transducer assembly suitable for the method of the present invention is shown in FIG. 9. The transducer assembly 500 is as disclosed in FIG. 5, i.e. it comprises a mechanical wave generating means 501, an optional waveguide, and a point-like pressure source 504 at the first end 500*a*, but the point like-pressure source 504 is in the form of a substantially circular protrusion. Exemplary substantially circular forms are circular, ellipsoid and oval forms. An exemplary structure of a circular point like pressure source is best seen in right portion of FIG. 9, wherein the area of the contact surface is presented with the symbol b3. The circular point-like pressure source is typically positioned around the acoustic axis 506 of the transducer assembly. Symbol d3 represents the distance between the acoustic axis and the inner edge of the circular point like pressure source.

FIGS. 10A-F represent exemplary non-limiting structures of the first ends and the point like pressure sources of a transducer assembly suitable for the method of the present invention.

Figure 10:
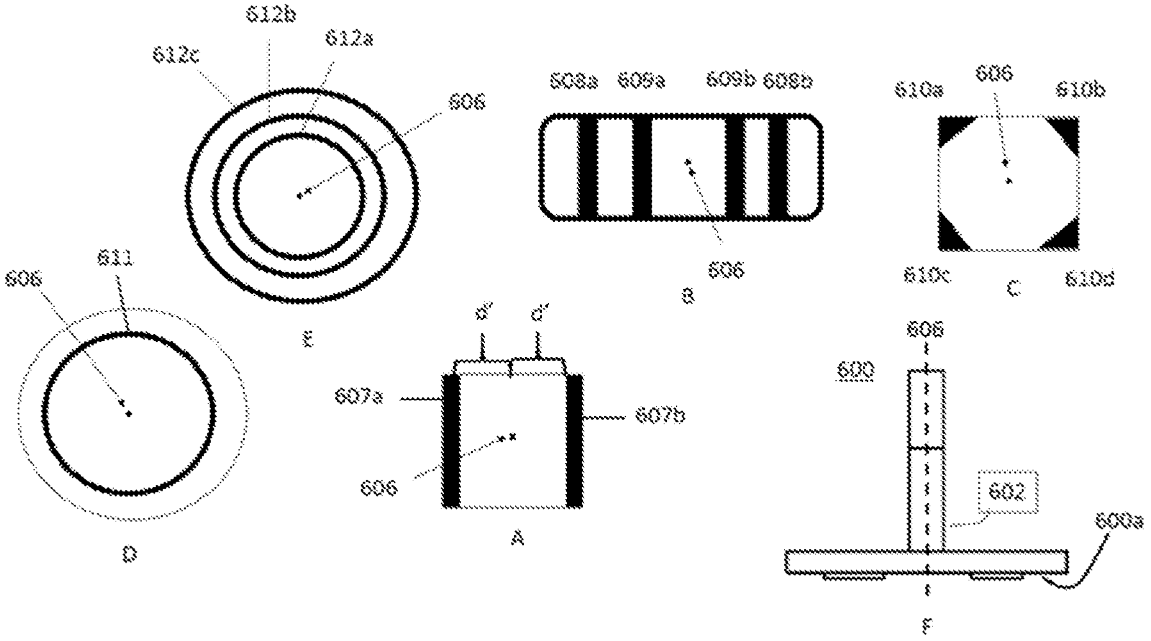
FIGS. 10A-F show exemplary designs of the first end and the point-like pressure sources a transducer assembly suitable for the method of the present invention.

In FIG. 10A, the first end is rectangular, and it comprises two protrusion protrusions 607*a* and 607*b*. The protrusion protrusions are in form of two parallel lines and their distance d' from the acoustic axis 606 is the same.

In FIG. 10B, the first end is rectangular, and it comprises two pairs of protrusion protrusions namely 608*a,b* and 609*a,b* in form of parallel lines. The distance of protrusion 608*a* and protrusion 608*b* from the acoustic axis 606 is the same. This is the case also with protrusion 609*a* and protrusion 609*b*.

In FIG. 10C, the first end of the waveguide is rectangular, and it comprises four protrusion protrusions 610*a-d* as triangles in the corners of the first end. The distance of each protrusion from the acoustic axis is the same.

In FIG. 10D, the first end of the waveguide is circular, and it comprises one circular protrusion 611 around the acoustic axis.

In FIG. 10E, the first end is circular, and it comprises three circular protrusion protrusions 612*a-c* around the acoustic axis.

According to a particular embodiment the area of the first end 600*a* of a transducer assembly 600 is larger than the cross-sectional area of the waveguide 602. This allows the acoustic radiation efficiency to be increased, by increasing the acoustic radiation impedance versus ultrasound impedance of the transducer. Side view of an exemplary transducer assembly 600 of this type is shown in FIG. 10F.

According to one embodiment the mechanical wave generating means is a Langevin transducer. A Langevin transducer comprises a front mass (head), a back mass (tail) and piezoelectric ceramics. A Langevin transducer is a resonant transducer for high-power ultrasonic actuation. The transducer is composed by a stack of piezoelectric disks 301*a*, e.g. 2, 4, 6 or 8 disks, clamped between two metallic bars, typically aluminum, titanium or stainless-steel, that feature a front mass and a back mass of the transducer, respectively. The length of the front mass and back mass of the transducer are tuned so that the transducer behaves as a half-wavelength resonator, i.e. a fundamental standing wave is born along the long axis of the transducer, featuring an antinode at both ends of the transducer. This results in an antinode at the first end 300*a* and at the second end 300*b* of the transducer assembly, and a nodal point at the middle of the waveguide. Such a transducer is narrowband featuring sharp resonance and anti-resonance, separated typically by a narrow, e.g. 1 kHz, frequency interval. Optimal and natural resonance behavior occurs when the transducer is driven in free space (no mechanical load). Any loading damps the resonance, increases the bandwidth and affects the resonance frequency. Heavy loading kills the fundamental resonance. Although the transducer assembly still is able to operate at higher resonance frequencies even when heavily loaded its efficiency is reduced. The higher resonance frequencies are in this case those of the coupled system, i.e. loading-modified higher resonance frequencies of the transducer assembly.

The transducer assembly 300 shown in FIG. 5 is in contact with the device to be cleaned via contact areas b1, b2 of the point-like pressure sources. An exemplary contact area is 110 $mm^2$ which is 10% of the area of the first end 300*a*, with exemplary variation between 1% and 30% of the surface area.

According to a preferable embodiment the distance d between the point-like pressure sources, i.e. the first protrusion and the second protrusion is 4h or less, wherein h is the thickness of the wall of the device. When d≤h, ultrasonic interference at the inner surface of the wall of the device is optimal. Analogously, when the transducer assembly comprises at least one circular protrusion as shown in FIG. 9, the radius d3 of the at least one circular protrusion is preferably ≤2h, wherein h is thickness of the wall.

Figure 11:
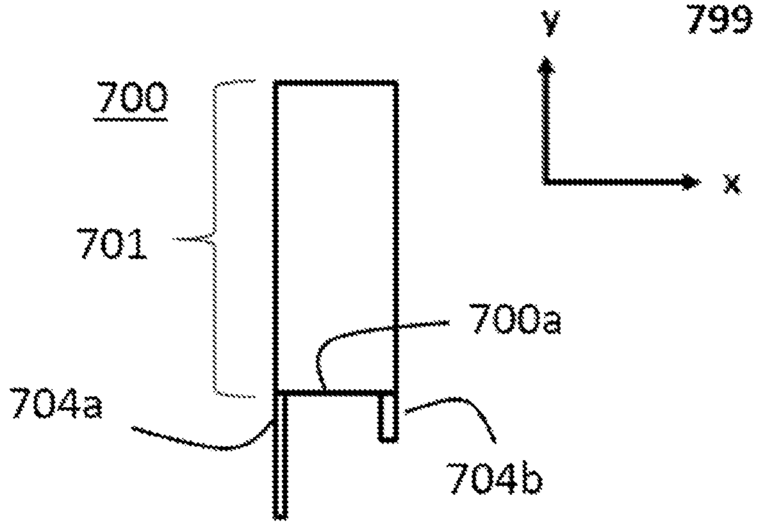

FIG. 11 represents an embodiment wherein length of the first protrusion 704*a* in the y-direction of the coordinate system 799 is longer than the length of the second protrusion 704*b*. According to this embodiment the pressure maximum on the inner surface of the device caused by the first protrusion occurs first, and the pressure maximum on the inner surface of the device caused by the second protrusion occurs later. Thus, by tuning the lengths of the protrusions along the y-direction of the coordinate system 799, the direction of the wave vectors and the direction of pressure pulses in the fluid can be changed as desired. Protrusions of different length provide a phase difference between the point sources on the wall surface. The phase difference affects the location of the interference point and the direction of the wave vectors formed and thus the direction of the acoustic pressure wave launched into the fluid.

The phase difference can be determined by the difference in times of flight of the mechanical wave in protrusions of different lengths with respect to the period of the waves. For example, if the difference in height of two protrusions is 60 mm it gives rise to a $\pi/2$ phase difference, 30 mm difference a $\pi/4$ phase difference and 15 mm difference a $\pi/8$ phase difference at 20 kHz, assuming that the speed of the sound in the protrusions is 5 km/s. Since the sound velocity in the protrusion depends on the geometry of the protrusion, adjusting the phase often requires finite element simulations.

According to a preferable embodiment the transducer assembly comprises one or more flanges 312, i.e. the transducer assembly has different cross-sectional areas, and the waveguide acts not only as a connection element between the mechanical wave generating means and the device to be cleaned, but also as a mechanical amplifier.

In contrast to the transducer 100, the contact area of the first surface of a waveguide of a transducer suitable for use in the method of the present invention, i.e. the contact area of the protrusions is less than 100%. According to a preferable embodiment, the contact area of the at least one pair of protrusions is 1-30%, more preferably 1-20%, most preferably about 10% of the total area of the first surface. An exemplary contact area of a protrusion or a circular protrusion acting as a point-line pressure source is 110-330 $mm^2$.

The thickness of the vessel wall of the device to be cleaned is typically 2-30 mm. The point like pressure sources such as the protrusions of the waveguides of a transducer are preferably made of material that is softer than the material of surface of the device. According to an exemplary embodiment, the surface of the device is made of stainless steel and the protrusions are made of aluminum.

According to another embodiment the present invention concerns a system comprising

- mechanical wave generating means 201, 301, 401, 501, 701 and
- a first end 200*a*, 300*a*, 400*a*, 500*a*, 700*a* comprising
  - at least one pair of protrusions 204*a,b*, 304*a,b*, 404*a,b*, 704*a,b* adapted to act as a pair of point-like pressure sources or
  - at least one substantially circular protrusion 504 adapted to act as a circular point like pressure source,
- wherein the mechanical wave generating means is adapted to emit a succession of mechanical waves towards the at least one pair of protrusions or the at least one substantially circular protrusion, and wherein the waveform of the mechanical waves is such that there is an antinode essentially at the first end.

The point like pressure sources are adapted to be in contact with the outer surface of the device to be cleaned. The sum of contact areas of the protrusions or the substantially circular protrusions 1-30%, more preferably 1-20%, most preferably about 10% of total area a of the first end 300*a*, 400*a* of the transducer. The distance between protrusions is typically 5-50 mm, preferably 4h or less, wherein h is the thickness of the wall of the device to be cleaned. Exemplary sum contact area is 110-330 $mm^2$.

According to a preferable embodiment the system comprises one of more flange portions positioned essentially at nodes of the wave form generated by the mechanical wave generating means.

EXPERIMENTAL

Design of the Transducer Assembly

The transducer assembly was composed of a piezoelectric ultrasonic stack transducer (Langevin transducer, sandwich transducer) and an optional waveguide. The transducer was either a commercially available model, or a custom made one. The transducer was a narrowband (featuring typically e.g. a 1 kHz bandwidth) resonant transducer, composed by a stack of piezoelectric disks (e.g. 2, 4, 6 or 8 disks), clamped between two metallic bars (typically aluminium, titanium or stainless steel) that feature front mass and back mass of the transducer.

The transducer design was based on a chosen resonant frequency (e.g. 20 kHz) which determines the choice (material and dimensions) of the piezoelectric disks. The stack of piezoelectric disks features a narrowband resonator. The lengths of the front mass and back mass were tuned such that the coupled resonator (i.e. transducer) behaves as a half-wavelength (lambda/2) resonator at the chosen frequency. This is the fundamental resonance of the transducer. The bandwidth remained narrow (e.g. 1 kHz). Transducer design was based on theoretical and/or numerical modelling (finite-element simulations).

An optional waveguide was fitted as an extension on the first end of the transducer. The length of the waveguide was chosen/tuned so as to maintain the fundamental resonance behavior of the transducer. To this end, the waveguide length must be a multiple of lambda/2. A waveguide may be useful e.g. to increase the q-value of the transducer assembly, to provide thermal insulation between the transducer and a system to be cleaned, or to provide flexibility in transducer placement in situations when the transducer cannot directly fit against the device to be cleaned. Waveguide design is based on theoretical and/or numerical modelling (e.g. finite-element simulations).

Point-like contacts (e.g. contact protrusions or circles) were machined as extensions on the first end of a transducer assembly. The shapes of the contact structures were evaluated and optimized by theoretical and/or numerical modelling (finite-element simulations).

EXAMPLE

A transducer assembly featuring contact protrusions was designed as described above. It delivered 9 dB more acoustic power into the water inside a steel vessel as compared to similar transducer with conventional mechanical contact. The experiment was carried out by calorimetric means in a thermally insulated vessel, at the fundamental frequency (20 kHz) of the transducer using the same electric input power.

What is claimed is:

1. A method for cleaning a device holding fluid, the device including a wall including an outer surface and an inner surface, the method comprising following steps:

providing a system comprising a mechanical wave generator, and a first end comprising one of:

(i) at least one pair of protrusions configured to act as a pair of point-like pressure sources, the at least one pair of protrusions comprising a first member and a second member, a phase difference between mechanical waves emitted via the first member and mechanical waves emitted via the second member being an even multiple of π, and (ii) at least one substantially circular protrusion configured to act as a substantially circular point-like pressure source;

contacting the at least one pair of protrusions or the at least one circular protrusion with the outer surface;

emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and producing, via the vibrating inner surface, a pressure pulse into the fluid.

2. The method according to claim 1, wherein the system further comprises a waveguide between the first end and the mechanical wave generator.

3. A method for cleaning a device holding fluid, the device including a wall including an outer surface and an inner surface, the method comprising following steps:

providing a system comprising a mechanical wave generator, and a first end comprising one of:

(i) at least one pair of protrusions configured to act as a pair of point-like pressure sources, the at least one pair of protrusions comprising a first member and second member, and wherein a phase difference between mechanical waves emitted via the first member and mechanical waves emitted via the second member being between an even multiple of π and an odd multiple of π, and (ii) at least one substantially circular protrusion configured to act as a substantially circular point-like pressure source;

contacting the at least one pair of protrusions or the at least one circular protrusion with the outer surface;

emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and producing, via the vibrating inner surface, a pressure pulse into the fluid.

4. A method for cleaning a device holding fluid, the device including a wall including an outer surface and an inner surface, the method comprising following steps:

providing a system comprising a mechanical wave generator, and a first end comprising one of:

(i) at least one pair of protrusions configured to act as a pair of point-like pressure sources, and (ii) at least one substantially circular protrusion configured to act as a substantially circular point-like pressure source;

contacting the at least one pair of protrusions or the at least one circular protrusion with the outer surface;

emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and producing, via the vibrating inner surface, a pressure pulse into the fluid, wherein the at least one pair of protrusions comprise a first member and a second member, and a distance d1 between the first member and the second member is ≤4h, wherein h is a thickness of the wall, or when the first end comprises at least one substantially circular protrusion, a radius d3 of the at least one substantially circular protrusion is ≤2h, wherein h is a thickness of the wall.

5. A method for cleaning a device holding fluid, the device including a wall including an outer surface and an inner surface, the method comprising following steps:

providing a system comprising a mechanical wave generator, and a first end comprising one of:

(i) at least one pair of protrusions configured to act as a pair of point-like pressure sources, and (ii) at least one substantially circular protrusion configured to act as a substantially circular point-like pressure source;

contacting the at least one pair of protrusions or the at least one circular protrusion with the outer surface;

emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and producing, via the vibrating inner surface, a pressure pulse into the fluid, wherein a sum of contact areas b1, b2 of the at least one pair of protrusions, or a contact area b3 of the at least one substantially circular protrusion with the outer surface is 1-30% of a total area a of the first end.

6. A method for cleaning a device holding fluid, the device including a wall including an outer surface and an inner surface, the method comprising following steps:

providing a system comprising a mechanical wave generator, and a first end comprising one of:

(i) at least one pair of protrusions configured to act as a pair of point-like pressure sources, and (ii) at least one substantially circular protrusion configured to act as a substantially circular point-like pressure source;

contacting the at least one pair of protrusions or the at least one circular protrusion with the outer surface;

emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and producing, via the vibrating inner surface, a pressure pulse into the fluid, wherein the system further comprises one or more flange portions, and the succession of mechanical waves comprise a node at the one or more flange portions.

7. A method for cleaning a device holding fluid, the device including a wall including an outer surface and an inner surface, the method comprising following steps:

providing a system comprising
a mechanical wave generator, and
a first end comprising one of:
(i) at least one pair of protrusions configured to act as a pair of point-like pressure sources, and
(ii) at least one substantially circular protrusion configured to act as a substantially circular point-like pressure source;
contacting the at least one pair of protrusions or the at least one circular protrusion with the outer surface;
emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and
producing, via the vibrating inner surface, a pressure pulse into the fluid,
wherein a thickness of the wall is 5-30 mm.

8. A method for cleaning a device holding fluid, the device including a wall including an outer surface and an inner surface, the method comprising following steps:
providing a system comprising
a mechanical wave generator, and
a first end comprising one of:
(i) at least one pair of protrusions configured to act as a pair of point-like pressure sources, and
(ii) at least one substantially circular protrusion configured to act as a substantially circular point-like pressure source;
contacting the at least one pair of protrusions or the at least one circular protrusion with the outer surface;
emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and
producing, via the vibrating inner surface, a pressure pulse into the fluid,
wherein the at least one pair of protrusions or the at least one substantially circular protrusion is made of material softer than a material of a surface of the device.

9. The method according to claim 1, wherein the device is a heat exchanger.

10. The method according to claim 1, wherein the fluid is a liquid.

11. A system for cleaning a device holding fluid, the system comprising:
a mechanical wave generator; and
a first end comprising one of:
at least one pair of protrusions configured to act as a pair of point-like pressure sources, and
at least one substantially circular protrusion configured to act as a circular point-like pressure source,
wherein the mechanical wave generator is configured to emit a succession of mechanical waves towards the at least one pair of protrusions or the at least one substantially circular protrusion, and
wherein a waveform of the mechanical waves is configured to generate an antinode at the first end,
wherein the at least one pair of protrusions or the at least one substantially circular protrusion is configured to be in contact with an outer surface of the device so that a sum of a contact area of the least one pair of protrusions or the at least one substantially circular protrusion with the outer surface is 1-30% of a total area of the first end.

12. The system according to claim 11, further comprising a waveguide between the first end and the mechanical wave generator.

13. A method for cleaning a device holding fluid, the method comprising:
providing the system of claim 11; and
applying the system to the device.

14. A method for cleaning a device holding fluid, the device including a wall including an outer surface and an inner surface, the method comprising following steps:
providing a system comprising
a mechanical wave generator, and
a first end comprising one of:
(i) at least one pair of protrusions configured to act as a pair of point-like pressure sources, and
(ii) at least one substantially circular protrusion configured to act as a substantially circular point-like pressure source;
contacting the at least one pair of protrusions or the at least one circular protrusion with the outer surface;
emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and
producing, via the vibrating inner surface, a pressure pulse into the fluid,
wherein a sum of contact areas b1, b2 of the at least one pair of protrusions, or a contact area b3 of the at least one substantially circular protrusion with the outer surface is 1-20% of a total area a of the first end.

15. A method for cleaning a device holding fluid, the device including a wall including an outer surface and an inner surface, the method comprising following steps:
providing a system comprising
a mechanical wave generator, and
a first end comprising one of:
(i) at least one pair of protrusions configured to act as a pair of point-like pressure sources, and
(ii) at least one substantially circular protrusion configured to act as a substantially circular point-like pressure source;
contacting the at least one pair of protrusions or the at least one circular protrusion with the outer surface;
emitting, by the mechanical wave generator, via the at least one pair of protrusions or via the at least one substantially circular protrusion contacting the outer surface, a succession of the mechanical waves comprising an antinode at the first end, towards the inner surface, the mechanical waves interfering on the inner surface and producing a vibrating inner surface; and
producing, via the vibrating inner surface, a pressure pulse into the fluid,
wherein a sum of contact areas b1, b2 of the at least one pair of protrusions, or a contact area b3 of the at least one substantially circular protrusion with the outer surface is 1-10% of a total area a of the first end.

16. The method according to claim 2, wherein the at least one pair of protrusions comprise a first member and a second member, and a distance d1 between the first member and the second member is ≤4h, wherein h is a thickness of the wall, or when the first end comprises at least one substantially circular protrusion, a radius d3 of the at least one substantially circular protrusion is ≤2h, wherein h is a thickness of the wall.

* * * * *